United States Patent
Hellekant

(10) Patent No.: US 10,036,419 B2
(45) Date of Patent: Jul. 31, 2018

(54) ROLLER OF A SUPPORT ARRANGEMENT FOR A ROTARY MILKING PLATFORM

(71) Applicant: DELAVAL HOLDING AB, Tumba (SE)

(72) Inventor: Otto Hellekant, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 0 days.

(21) Appl. No.: 15/303,255

(22) PCT Filed: Apr. 27, 2015

(86) PCT No.: PCT/SE2015/050464
§ 371 (c)(1),
(2) Date: Oct. 11, 2016

(87) PCT Pub. No.: WO2015/167390
PCT Pub. Date: Nov. 5, 2015

(65) Prior Publication Data
US 2017/0030406 A1 Feb. 2, 2017

(30) Foreign Application Priority Data
Apr. 29, 2014 (SE) ...................... 1450506

(51) Int. Cl.
*F16C 19/26* (2006.01)
*F16C 23/08* (2006.01)
(Continued)

(52) U.S. Cl.
CPC .............. *F16C 19/26* (2013.01); *A01K 1/126* (2013.01); *F16C 19/30* (2013.01); *F16C 19/507* (2013.01);
(Continued)

(58) Field of Classification Search
CPC ........ F16C 19/26; F16C 19/30; F16C 19/507; F16C 23/088; F16C 33/34; F16C 33/526; F16C 2300/14; A01K 1/126
(Continued)

(56) References Cited

U.S. PATENT DOCUMENTS 2,049,653 A * 8/1936 Ljungkull ............... E02F 9/121
212/175
3,815,959 A 6/1974 Hill
(Continued)

FOREIGN PATENT DOCUMENTS

BE 529742 * 7/1954
CN 1662393 A 8/2005
(Continued)

OTHER PUBLICATIONS

International-Type Search Report, dated Nov. 27, 2014, from corresponding PCT application.
(Continued)

*Primary Examiner* — Marcus Charles
(74) *Attorney, Agent, or Firm* — Young & Thompson

(57) ABSTRACT

A roller of a support arrangement for a rotary milking platform, where the support arrangement includes a first rail member fixedly connected to the rotary platform, a second rail member stationarily arranged in a position below the platform, and a plurality of rollers arranged in a vertical space between the first rail member and the second rail member. Each roller includes a peripheral surface comprising a contact surface to be in contact with a contact portion of the first rail member and a contact portion of the second rail member. The peripheral surface of the roller includes two beveled surfaces arranged at opposite sides of the contact surface which are located at a smaller distance from a rotary axis of the roller than the contact surface.

14 Claims, 4 Drawing Sheets

(51) Int. Cl.
*A01K 1/12* (2006.01)
*F16C 33/34* (2006.01)
*F16C 19/30* (2006.01)
*F16C 19/50* (2006.01)
*F16C 33/52* (2006.01)

(52) U.S. Cl.
CPC ............ *F16C 23/088* (2013.01); *F16C 33/34* (2013.01); *F16C 33/526* (2013.01); *F16C 2300/14* (2013.01)

(58) Field of Classification Search
USPC ........ 384/564–565, 568, 593, 597, 619, 622
See application file for complete search history.

(56) References Cited

U.S. PATENT DOCUMENTS

| | | | | |
|---|---|---|---|---|
| 4,329,795 | A * | 5/1982 | Kalve | E02F 9/121 212/175 |
| 4,461,515 | A | 7/1984 | Gwynette et al. | |
| 4,639,970 | A * | 2/1987 | Adams | E05D 15/066 16/100 |
| 4,723,852 | A * | 2/1988 | Ehret | E02F 9/006 384/620 |
| 4,769,932 | A * | 9/1988 | Kalve | E02F 3/46 212/175 |
| 5,205,657 | A * | 4/1993 | Feld | B66C 23/84 384/618 |
| 5,676,471 | A * | 10/1997 | Kallenberger | B66C 23/84 384/593 |
| 7,032,734 | B2 | 4/2006 | Austin | |
| 7,303,049 | B1 * | 12/2007 | Greenlee | B66C 17/06 182/3 |
| 8,573,852 | B2 * | 11/2013 | Knuth | E02F 9/123 384/593 |
| 2012/0121215 | A1 | 5/2012 | Knuth | |

FOREIGN PATENT DOCUMENTS

| | | |
|---|---|---|
| CN | 201268195 Y | 7/2009 |
| CN | 102582356 A | 7/2012 |
| GB | 660009 A | 10/1951 |
| GB | 2 158 017 A | 11/1985 |
| RU | 2 466 533 C1 | 11/2012 |
| SU | 1356996 A1 | 12/1987 |
| WO | 2011/091530 A1 | 8/2011 |

OTHER PUBLICATIONS

International Search Report, dated Aug. 19, 2015, from corresponding PCT application.
Supplementary International Search Report, dated Jan. 22, 2016, from corresponding PCT application.
AutoRotor Magnum 90, GEA Farm Technologies GmbH, Aug. 2011, pp. 1-12, https://www.gea.com/it/binaries/DairyFarming_AR_Magnum_90_Broschüre_DE_0315_tcm39-22252.pdf, [retrieved on Jan. 17, 2018], with English Translation.
European Office Action issued in Application No. 15 724 088.8, dated Jan. 23, 2018.

* cited by examiner

ROLLER OF A SUPPORT ARRANGEMENT FOR A ROTARY MILKING PLATFORM

CROSS REFERENCE TO RELATED APPLICATIONS

This application is the U.S. National Stage of PCT/SE2015/050464 filed Apr. 27, and 2015, which claims priority to SE 1450506-9 filed Apr. 29, 2014.

THE BACKGROUND OF THE INVENTION AND PRIOR ART

The present invention relates to a roller of a support arrangement for a rotary milking platform, wherein the support arrangement comprises a first rail member fixedly connected to the rotary platform, a second rail member stationarily arranged in a position below the platform, and a plurality of rollers arranged in a vertical space between the first rail member and the second rail member, wherein said roller is one of said plurality of rollers, and comprises a peripheral surface to be in contact with a contact portion of the first rail member and a contact portion of the second rail member. The roller rolls on the stationary second rail member at the same time as it supports and provides a rotary motion of the first rail member and the platform above the stationary second rail member. The roller is a support roller which forms an underlying support of the platform. The support rollers of the support arrangement are to support the whole weight of the platform and the animals on the platform during a milking process.

Conventional support arrangements for rotary milking platforms comprise rollers with cylindrical contact surfaces rolling along a substantially flat contact surface of a rail member connected to the platform. The rollers may be provided with flange portions. In this case, the support arrangement comprises rollers which rotate around a respective horizontal axis such that they form a vertical support of the platform at the same time as the flanged portions provide a positioning of the platform in a horizontal plane. A support arrangement comprising rollers without flange portions includes support rollers which rotate around a horizontal axis and side rollers which rotate around a vertical axis. The support rollers form a vertical support of the platform and the side rollers provide a horizontal positioning of the platform.

A rotary milking platform supporting cows is heavy and the load on the rollers is high. The rollers are many times manufactured by a plastic material such as nylon. Especially the side portions of the contact surface of the rollers may become worn out. The side portions of the contact surfaces can start to crack and parts of them can fall off. Furthermore, it is difficult and time consuming to exchange worn out rollers supporting a rotary milking platform.

SUMMARY OF THE INVENTION

The object of the present invention is to provide a roller of a support arrangement for a rotary milking platform which has a design such that it obtains a longer life than prior art rollers.

This object is achieved by the initially defined roller which is characterised in that the peripheral surface of the roller comprises two beveled surfaces arranged at opposite sides of the contact surface which are located at a smaller distance from a rotary axis of the roller than the contact surface. A roller of a support arrangement for a rotary platform is subjected to large loads, which results in stresses in the roller. Cracks and other kinds of deformations are usually initiated in areas with high stress concentration. Consequently, it is important to distribute the stresses substantially evenly in the roller such that stress concentrations are avoided. Stress concentrations are formed, for example, in sharp edge portions of a material body. In conventional cylindrical rollers without flange portions, the transition areas between the contact surface and the side surfaces are edge portions in which stress concentrations are formed. In conventional cylindrical rollers with flange portions, the transition areas between the contact surface and the flange portions are edge portions in which stress concentrations are formed. In said edge portions, the adjacent surfaces form an angle of about 90 degrees.

The stress concentration is related to the angle between the adjacent surfaces in the edge portion. The stress concentration is higher in sharp edge portions than in less sharp edge portions. In the present roller, the contact surface is surrounded by two beveled surfaces. Thereby, the angle in the transition area between the contact surface and the adjacent beveled surfaces will be larger than 90 degrees. Preferably, the angle between the contact surface and the beveled surfaces will be 135 degrees or larger. Consequently, the present roller has less sharp edge portions in the transition areas between the contact surface and adjacent surfaces than a conventional roller. Thereby, the present roller will obtain less stress concentrations in the transition areas and a longer life time than a conventional roller.

According to an embodiment of the invention, the contact surface has a convex shape in an axial direction of the roller. The convex shape of the contact surface allows for some margin of error during a mounting process of the roller in relation to a flat surface of rail member. Furthermore, the convex shape of the contact surface ensures that the main load on the roller will be created on a central area of the contact surface and at a distance from the transition areas between the contact surface and the beveled surfaces. Thereby, the stresses in the transition areas will be further reduced. The contact surface may be located at the longest distance from the rotation axis of the roller in a midway position between the beveled surfaces. In this case, the contact surface may have a symmetric convex shape on opposite sides of said midway position.

According to a further embodiment of the invention, the entire contact surface of the peripheral surface is located at the same distance from the rotation axis of the roller. In this case, the contact surface has a cylindrical surface surrounded by beveled surfaces. A roller with a cylindrical contact surface is relatively easy to manufacture. The beveled surfaces may be located at a distance from the rotation axis which increases linearly from an outer end portion to an inner end portion located adjacent to the contact surface. In this case, the beveled surfaces also have a simple design.

According to a further embodiment of the invention, the beveled surfaces may have a convex shape. In this case, it is possible to form a very smooth transition area between the contact surface and the beveled surfaces which further reduces the concentration of stress in the transition areas. The convex contact surface may have a larger radius of curvature than the convex beveled surfaces. Thus, the beveled surfaces will have a more curved surface than the contact surface.

According to a further embodiment of the invention, the roller comprises flange portions each having a radial outer surface located at a longer distance from the rotation axis than the peripheral surface. The flange portions may position the platform in a horizontal plane such that it rotates around a fixed central vertical axis. The beveled surface of the roller may be connected to the respective flange portions via a concave curved connection portion. The beveled surfaces form a relatively sharp angle to the vertical surface of the flange portions. In order to reduce stress concentrations in this area, it is suitable to use a concave curved connection portion between the beveled surfaces and the vertical surfaces of the flange portions.

According to a further embodiment of the invention, the roller comprises a centre hole configured to receive a non-rotatable shaft defining a rotation axis of the roller. In this case, the roller rotates around the non-rotatable shaft. Such a roller may have a simple design. In this case, the ends of the shaft have fixed connections to suitable components arranged on opposite sides of the roller. Alternatively, the roller and the shaft are formed as a rotary unit. In this case, the shaft has to be rotatably arranged on opposite sides of the roller. The centre hole may be configured to receive a shaft connecting the roller to two elongated connection elements arranged on opposite sides of the roller. Such connection elements may constitute a connection between several of the rollers in the support arrangement. The connection element may have an extension corresponding to that of the rail members such that all rollers in the support arrangement are connected to each other, either as one circular element or as a number of interconnected elements which each extends between only a few of the rollers. Preferably, the rollers are connected to the connection element or elements at constant intervals around the whole circular support arrangement.

According to a further embodiment of the invention, the roller is manufactured of a material body in one piece. The roller may be a homogeneous body of a wear resistant material. The roller may be e.g. manufactured of a nylon material. Nylon rollers have excellent impact resistance, good load capacity, good chemical resistance, low coefficient of friction, good vibration absorbing properties and they can be manufactured at a low cost.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED
EMBODIMENTS OF THE INVENTION

Figure 1:
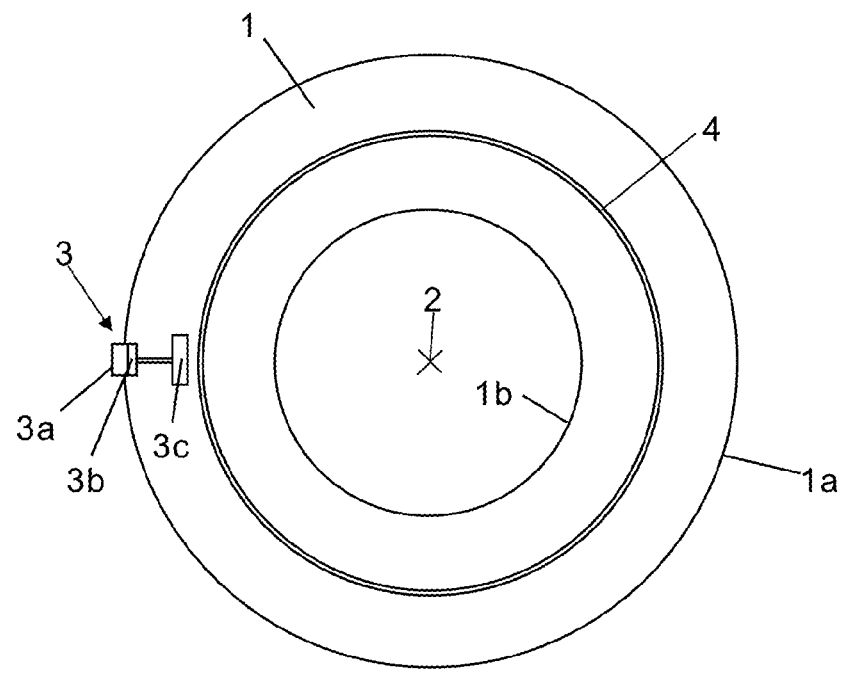
FIG. 1 shows a view of a rotary milking platform from below.

FIG. 1 shows a rotary milking platform 1 for milking of cows, from below. The platform 1 is rotatably arranged around a vertical axis 2. The platform 1 has an outer edge portion 1a and an inner edge portion 1b. The platform 1 is driven by a drive unit 3. The drive unit 3 comprises an electric motor 3a, an integrated reduction gear box 3b and a drive wheel 3c mounted in contact with a lower surface of the platform 1. The drive wheel 3c may be a pneumatic tyre. Such a drive wheel 3 makes the drive unit shock resistant as the tyre provides a cushioning effect. The drive unit 3 has a smooth start and stop action. The drive unit 3 may be infinitely variable in speed in either a clockwise or counter-clockwise direction. A first circular rail member 4 is fixedly attached to a lower surface of the platform 1. The first circular rail member 4 may by attached to the platform by welding. The first circular rail member 4 may be directly connected to a lower surface of the platform 1 or indirectly via a suitable connection.

Figure 2:
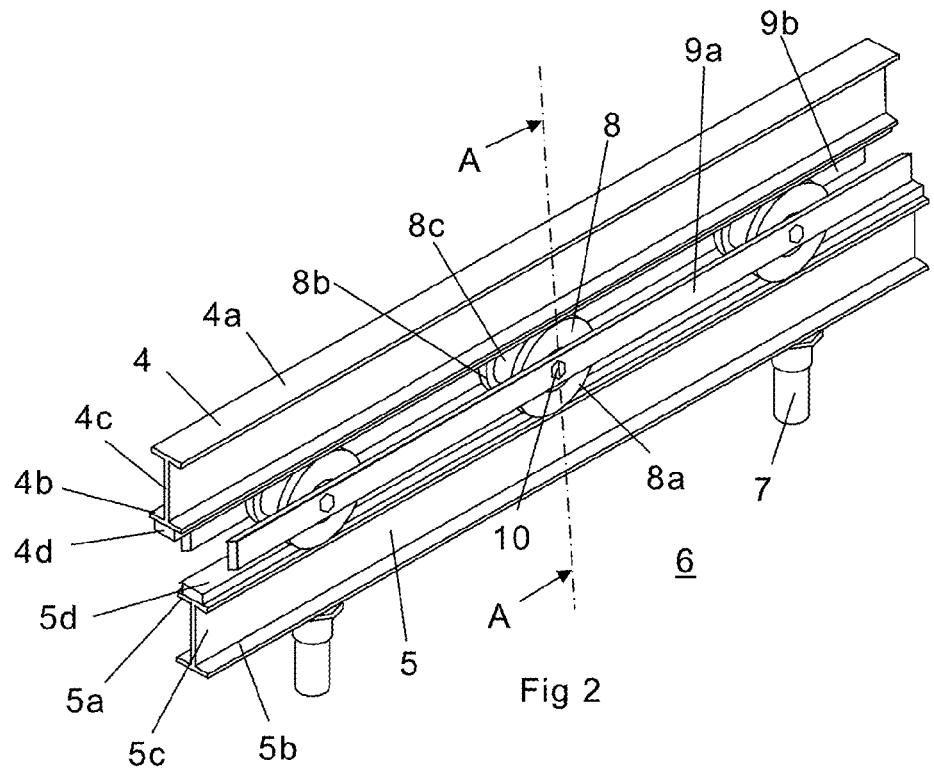
FIG. 2 shows a perspective view of a part of a support arrangement for a platform according to the invention.

FIG. 2 shows a part of a support arrangement for the platform 1. The first circular rail member 4 comprises a beam with an I-shaped cross section. The first circular rail member 4 comprises an upper horizontal portion 4a, a lower horizontal portion 4b and a vertical portion 4c connecting the upper horizontal portion 4a and the lower horizontal portion 4b. The first circular rail member 4 comprises an elongated contact portion 4d mounted on a lower surface of the lower horizontal portion 4b. The contact portion 4d may be welded to the lower horizontal portion 4b. The support arrangement comprises a second circular rail member 5 arranged on a stationary surface 6 below the rotary platform 1 by means of a suitable number of support legs 7. The second rail member 5 also comprises a beam with an I-shaped cross section. The second rail member 5 comprises an upper horizontal portion 5a, a lower horizontal portion 5b and a vertical portion 5c connecting the upper horizontal portion 5a and the lower horizontal portion 5b. The second rail member 5 also comprises a contact portion 5d mounted on an upper surface of the upper horizontal portion 5a. The contact portion 5d may be welded to the upper horizontal portion 5a. The second rail member 5 is arranged vertically below the first circular rail member 4.

The support arrangement comprises a number of rollers 8 arranged in a vertical space between the first circular rail member 4 and the second circular rail member 5. Each roller 8 is provided with a first side flange 8a, a second side flange 8b and a peripheral surface 8c arranged between the side flanges 8a, 8b. A first elongated connection element 9a and a second elongated connection element 9b are arranged on opposite sides on the rollers 8. The connection elements 9a, 9b have a corresponding circular extension as the rail members 4, 5, either as circular elements or each as a number of interconnected elements which each extends between only a few of the rollers. The connection elements 9a, 9b are provided with holes at constant intervals. The rollers 8 are rotatably arranged around bolts 10 arranged in said holes. The distance between two adjacent holes of the elongated connection elements 9a, 9b defines the distance between two adjacent rollers 8.

Figure 3:
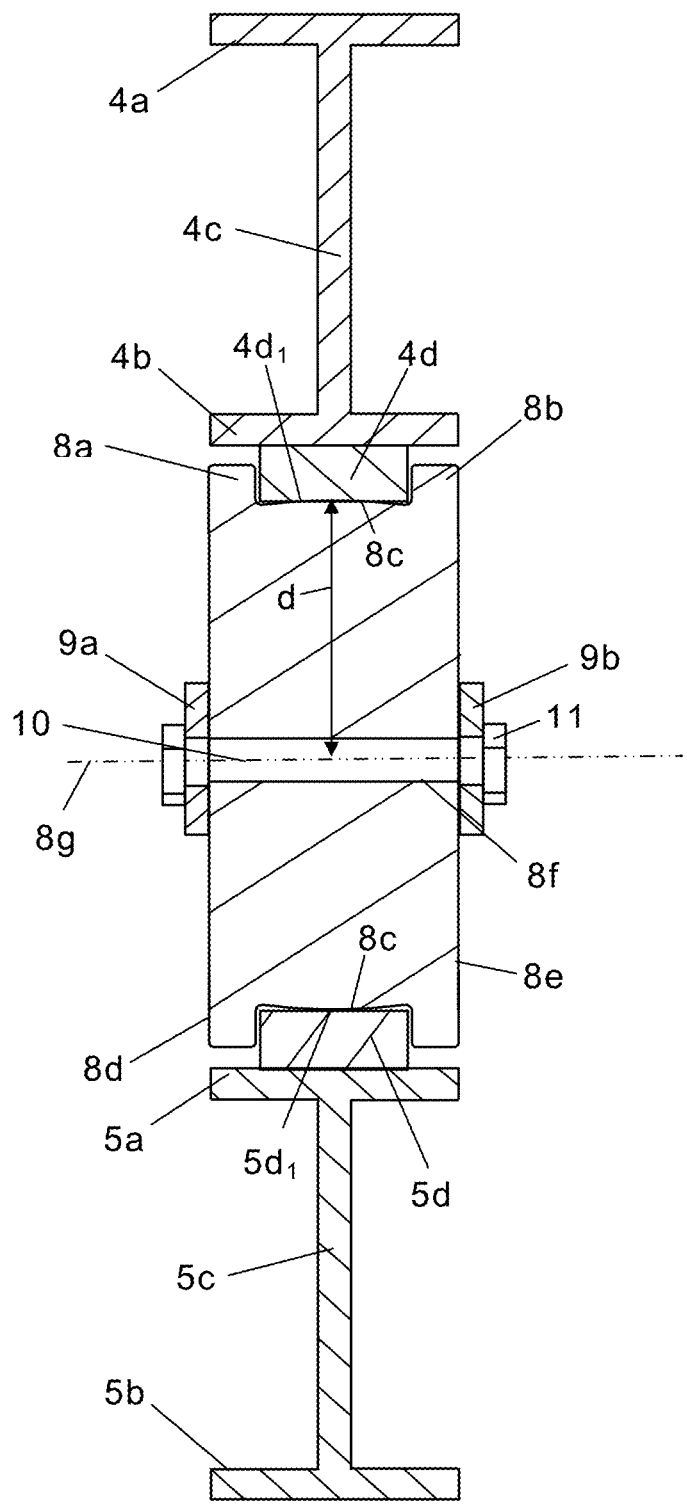
FIG. 3 shows a sectional view of the support arrangement in FIG. 2 along the plane A-A.

FIG. 3 shows a cross section view of the support arrangement and one of the rollers 8 in FIG. 2. The roller 8 comprises a first side surface 8d and a second side surface 8e. The roller 8 comprises a centrally arranged hole 8f extending between the side surfaces 8d, 8e. The centre hole 8f defines a rotation axis 8g of the roller 8. The peripheral surface 8c of the roller 8 is in contact with a lower flat surface $4d_1$ of the contact portion 4d of the first rail member 4 and an upper flat surface $5d_1$ of the contact portion 5d of the second rail member 5. The peripheral surface 8c of the roller 8 is located at a smaller radial distance from the rotation axis 8g than a peripheral surface of the first side flange 8a and a peripheral surface of the second side flange 8b. Thus, at least a part of the contact portions 4d, 5d of the rail members 4, 5 are located in a space between the side flanges 8a, 8b of the roller 8.

During rotation of the platform 1, the side flanges 8a, 8b prevent side movements of the first rail member 4 and the platform 1 in relation to the rolling member 8 and the stationary rail member 5. The side flanges 8a, 8b position the first rail member 4 vertically above the second rail member 5 and the platform 1 in a horizontal plane such that it rotates around the fixed vertical axis 2. The roller 8 is rotatably arranged around a non-rotatable shaft in the form of the centre bolt 10. The centre bolt 10 has a head arranged outside the first elongated element 9a. The centre bolt 10 has an elongated body extending through a hole in the first elongated element 9a, the centre hole 8f of the roller 8 and a hole in the second elongated element 9b. The centre bolt 10 is fastened by means of a nut 11 arranged on the outside of the second elongated element 9b.

Figure 4:
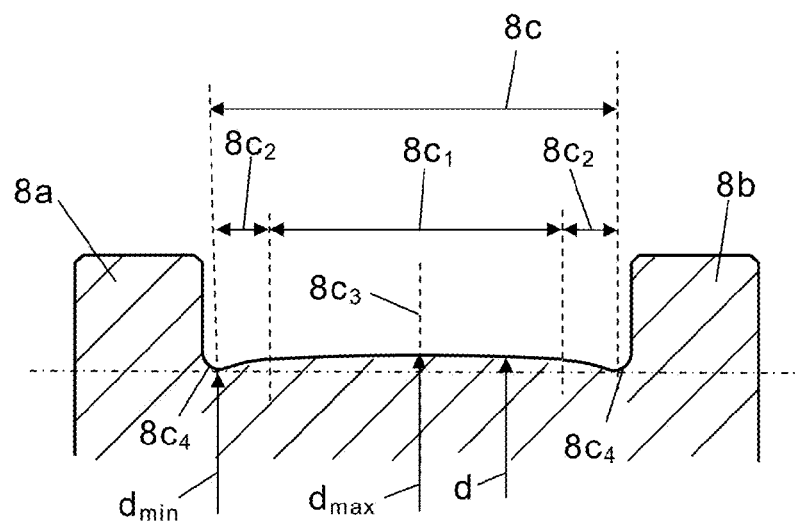
FIG. 4 shows the peripheral surface of the roller in FIG. 3 in more detail.

FIG. 4 shows the peripheral surface 8c of the roller 8 in an axial plane through the roller 8. The peripheral surface 8c comprises a contact surface $8c_1$. The contact surface $8c_1$ is surrounded by two beveled surfaces $8c_2$. The contact surface $8c_1$ has a larger width than the two beveled surfaces $8c_2$. The contact surface $8c_1$ is located at a longer distance d from a rotation axis 8g of the roller 8 than the two beveled surfaces $8c_2$. The contact surface $8c_1$ has a convex shape. The contact surface $8c_1$ is located at the longest distance from the rotation axis 8g of the roller 8 in a midway position $8c_3$ between the two beveled surfaces $8c_2$. Each beveled surface $8c_2$ also has a convex shape. The convex beveled surfaces $8c_2$ have a smaller radius of curvature than the convex contact surface $8c_1$. Thus, the beveled surfaces $8c_2$ have a more curved shape than the contact surface $8c_1$. However, the beveled surfaces $8c_2$ are shaped such that they are located at a successively longer distance d from the rotation axis 8g from an outer end of the beveled surface $8c_2$ to an inner end of the beveled surface $8c_1$ located adjacent to the contact surface $8c_1$. The roller 8 comprises flange portions 8a, 8b having an outer surface located at a longer distance from the rotation axis 8g than the peripheral surface 8c. Each beveled surface $8c_2$ is connected to the flange portions 8a, 8b via concave curved connection portions $8c_4$.

The contact surface $8c_1$ of the roller 8 is in contact with a flat surface $4d_1$, $5d_1$ of the contact portions 4d, 5d. The convex shape of the contact surface $8c_1$ allows a small misalignment of the roller 8 in relation to the flat contact surfaces $4d_1$, $5d_1$ of the contact portions 4, 5. Furthermore, the parts of the contact surface $8c_1$ located adjacent to the beveled surfaces $8c_2$ will be less loaded than a more central part of the contact surface $8c_1$. Due to the convex curved shape of the beveled surfaces $8c_2$, it is possible to provide a smooth transition area between the beveled surfaces $8c_2$ and the contact surface $8c_1$. Such a transition area has substantially no edge portions in which stress concentrations can be created.

Consequently, the convex beveled surfaces $8c_2$ prevents stress concentrations in the transition area between the contact surface $8c_1$ and the beveled surfaces $8c_2$. Furthermore, the curved portions $8c_4$ between the flange portions 8a, 8b and the beveled surfaces $8c_2$ reduces stress concentrations in an area located between the vertical surfaces of the flange portions 8a, 8b and the beveled surfaces $8c_2$. Consequently, the peripheral surface 8c of the roller 8 has a design without sharp edge portions and substantially without stress concentrations.

Figure 5:
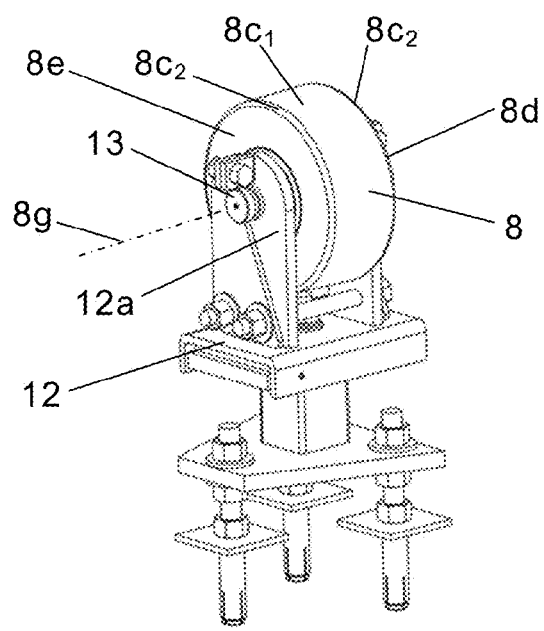
FIG. 5 shows a support structure for a single roller according to the invention.
Figure 6:
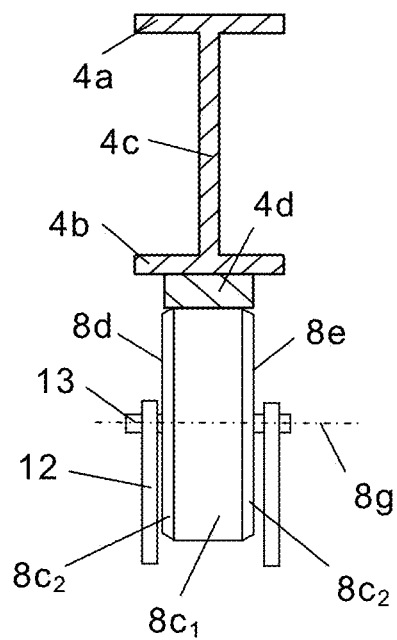
FIG. 6 shows the roller In FIG. 6 in contact with a rail member and FIG. 7 shows a support structure for two side rollers.

FIGS. 5 and 6 shows a stationary support structure 12 to be arranged in a position under a rotary platform 1. The support structure 12 supports one roller 8. The roller 8 is rotatably arranged around a centre shaft 13 and a horizontal axis 8g. The roller 8 comprises a contact surface $8c_1$ having a flat shape in an axial direction. Thus, the entire contact surface $8c_1$ is located at the same distance from the rotation axis 8g of the roller 8. The contact surface $8c_1$ is located between two beveled surfaces $8c_2$. In this case, each beveled surface $8c_2$ is located at a distance d from the rotation axis 8g which increases linearly from an outer end to an inner end located adjacent to the contact surface $8c_1$. Such a roller 8 has a simple design and it is easy to manufacture.

The beveled surfaces $8c_2$ connect the contact surface $8c_1$ and the side surfaces 8d, 8e of the roller 8. In this case, the transition areas between the contact surface $8c_1$ and the beveled surfaces $8c_2$ comprise an edge portion. A conventional cylindrical roller without beveled surfaces $8c_2$ has transition areas between the contact surface $8c_1$ and the side surfaces 8d, 8e in which said surfaces form an angle of 90 degrees in relation to each other. However, the edge portions of the present roller 8 include a larger angle than 90 degrees in the transition area between the contact surface $8c_1$ and the beveled surface $8c_2$. Since the stress concentration is higher in a sharp edge portion than in a less sharp edge portion, the stress concentration will be lesser in the transition areas of the present roller 8 than in the corresponding transition areas of a conventional cylindrical roller. Due to the less stress concentration in the present roller 8, it provides advantages regarding strength and life time in relation to a conventional roller.

Figure 7:
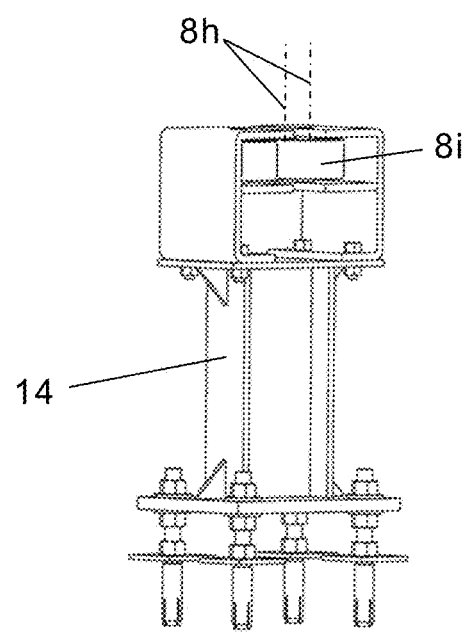

FIG. 7 shows a stationary support structure 14 to be arranged in a position under a rotary platform 1. The support structure 14 supports two side rollers 8i. Each side roller 8i is rotatably arranged around a vertical axis 8h. The side rollers 8i are configured to come in contact with a vertical surface of a rail member fixedly connected to the platform 1. The object of the side rollers 8i is to prevent side moments of the platform 1 such that it rotates around a fixed vertical axis. The side rollers 8i constitute a complement to the support rollers 8 shown in FIG. 5 and FIG. 6, which have no flange portions. The load on the side rollers 8i is much smaller than the load on the support rollers 8. Therefore, it is not necessary to provide the contact surfaces of the side rollers 8i with beveled surfaces.

The above mentioned rollers 8 may be manufactured of a material body in one piece. The material may be a nylon material. Such a material has suitable properties for supporting a heavy rotary platform. However, it is possible to manufacture the rollers 8 of other materials. Furthermore, the rollers 8 may comprise different materials in different parts.

The invention is not restricted to the described embodiment in the figures, but may be varied freely within the scope of the claims. A roller may, for example, comprise a flat contact surface $8c_1$ surrounded by two convex beveled surfaces $8c_2$. On the other hand, the roller may comprise a convex contact surface $8c_1$ surrounded by beveled surfaces located at a distance d from the rotation axis 8g which increases linearly from an outer end to an inner end located adjacent to the contact surface $8c_1$.

The invention claimed is:
1. A support arrangement comprising:
  a rotary milking platform,
  a first rail member (4) fixedly connected to the rotary milking platform (1),
  a second rail member (5) stationarily arranged in a position below the milking platform (1), and
  a plurality of rollers arranged in a vertical space between the first rail member (4) and the second rail member (5), wherein said roller (8) is one of said plurality of rollers, and comprises a peripheral surface (8c) comprising a contact surface ($8c_1$) to be in contact with a contact portion (4d) of the first rail member (4) and a contact portion (5d) of the second rail member (5), wherein the peripheral surface (8c) of the roller (8) comprises two bevelled surfaces ($8c_2$) arranged at opposite sides of the contact surface ($8c_1$), the two bevelled surfaces (8c2) being located at a smaller distance (d) from a rotary axis (8g) of the roller (8) than the contact surface ($8c_1$), a width of the contact surface (8c1) is larger than a width of the two bevelled surfaces (8c2), and wherein the contact surface (8c1) has a first convex shape with a first curvature with a first radius of curvature, and the two bevelled surfaces (8c2) have a second convex shape with a second curvature with a second radius of curvature, the second radius of curvature being smaller than the first radius of curvature, the two bevelled surfaces (8c2) having a more curved shape than the contact surface (8c1).

2. The support arrangement according to claim 1, further comprising a transition area between the contact surface (8c1) and each of the two bevelled surfaces (8c2), wherein an angle in each transition area between the contact surface ($8c_1$) and each of the two bevelled surfaces ($8c_2$) is at least 135degrees.

3. The support arrangement according to claim 1, wherein the contact surface ($8c_1$) is located at a longest distance ($d_{max}$) from the rotation axis (8g) of the roller (8) in a midway position between the two bevelled surfaces ($8c_2$).

4. The support arrangement according to claim 1, further comprising flange portions (8a, 8b), each flange portion having a radial outer surface located at a longer distance from the rotation axis (8g) than the peripheral surface (8c).

5. The support arrangement according to claim 4, wherein each of the two bevelled surfaces ($8c_2$) of the roller (8) is connected to the flange portions (8a, 8b) via a curved connection portion ($8c_4$).

6. The support arrangement according to claim 1, further comprising a center hole (8f) defining the rotation axis (8g) of the roller (8).

7. The support arrangement according to claim 6, the center hole (8f) is configured to receive a shaft (10, 13) connecting the roller (8) to two support elements (9a, 9b, 12a) arranged on opposite sides of the roller (8).

8. The support arrangement according to claim 1, wherein the roller (8) is a material body in one piece.

9. The support arrangement according to claim 8, wherein the roller (8) is comprised of a nylon material.

10. The support arrangement according to claim 1, further comprising:
a center hole (8f) defining the rotation axis (8g) of the roller (8);
a transition area between the contact surface (8c1) and each of the two bevelled surfaces (8c2); and
two flange portions (8a, 8b), each flange portion having a radial outer surface located at a longer distance from the rotation axis (8g) than the peripheral surface (8c),
wherein an angle in each transition area between the contact surface ($8c_1$) and each of the two bevelled surfaces ($8c_2$) is at least 135 degrees,
wherein the contact surface ($8c_1$) is located at a longest distance ($d_{max}$) from the rotation axis (8g) of the roller (8) in a midway position between the two bevelled surfaces ($8c_2$),
wherein the contact surface ($8c_1$) has a convex shape,
wherein the two bevelled surfaces ($8c_2$) have a convex shape,
wherein the two bevelled surfaces ($8c_2$) have a smaller radius of curvature than a radius of curvature of the convex contact surface ($8c_1$),
wherein each of the two bevelled surfaces ($8c_2$) of the roller (8) is connected to the flange portions (8a, 8b) via a curved connection portion ($8c_4$), and
the center hole (8f) is configured to receive a shaft (10, 13) connecting the roller (8) to two support elements (9a, 9b, 12a) arranged on opposite sides of the roller (8).

11. The support arrangement according to claim 1, further comprising:
a center hole (8f) defining the rotation axis (8g) of the roller (8);
a transition area between the contact surface (8c1) and each of the two bevelled surfaces (8c2); and
two flange portions (8a, 8b), each flange portion having a radial outer surface located at a longer distance from the rotation axis (8g) than the peripheral surface (8c),
a transition area between the contact surface (8c1) and each of the two bevelled surfaces (8c2),
wherein an angle in each transition area between the contact surface ($8c_1$) and each of the two bevelled surfaces ($8c_2$) is at least 135 degrees,
wherein the contact surface ($8c_1$) is located at a longest distance ($d_{max}$) from the rotation axis (8g) of the roller (8) in a midway position between the two bevelled surfaces ($8c_2$),
wherein all of the contact surface ($8c_1$) of the peripheral surface (8c) is located at a same distance from the rotation axis (8g) of the roller (8),
wherein each of the two bevelled surfaces ($8c_2$) is located at a distance (d) from the rotation axis (8g) which increases linearly from an outer end to an inner end located adjacent to the contact surface ($8c_1$),
wherein each of the two bevelled surfaces ($8c_2$) of the roller (8) is connected to the flange portions (8a, 8b) via a curved connection portion ($8c_4$), and
the center hole (8f) is configured to receive a shaft (10, 13) connecting the roller (8) to two support elements (9a, 9b, 12a) arranged on opposite sides of the roller (8).

12. A support arrangement comprising:
a rotary milking platform (1),
a first rail member (4) fixedly connected to the rotary milking platform (1),
a second rail member (5) stationarily arranged in a position below the milking platform (1), and
a plurality of rollers arranged in a vertical space between the first rail member (4) and the second rail member (5),
wherein said roller (8) is one of said plurality of rollers, and comprises a peripheral surface (8c) comprising a contact surface (8c1) to be in contact with a contact portion (4d) of the first rail member (4) and a contact portion (5d) of the second rail member (5),
wherein the peripheral surface (8c) of the roller (8) comprises two bevelled surfaces (8c2) arranged at opposite sides of the contact surface (8c), the two bevelled surfaces (8c2) being located at a smaller distance (d) from a rotary axis (8g) of the roller (8) than the contact surface (8c1),
wherein a width of the contact surface (8c1) is larger than a width of the two bevelled surfaces (8c2), and
wherein all of the contact surface ($8c_1$) of the peripheral surface (8c) is located at a same distance from the rotation axis ($8g$) of the roller (8), the contact surface (8*c*) being a cylindrical surface surrounded by the two bevelled surfaces (8*c*2).

13. The support arrangement according to claim 12, wherein each of the two bevelled surfaces ($8c_2$) is located at a distance (d) from the rotation axis ($8g$) which increases linearly from an outer end to an inner end located adjacent to the contact surface ($8c_1$).

14. The support arrangement according to claim 12, further comprising flange portions (8*a*, 8*b*), each flange portion having a radial outer surface located at a longer distance from the rotation axis ($8g$) than the peripheral surface (8*c*).

* * * * *